(12) United States Patent
Wang

(10) Patent No.: US 7,401,214 B2
(45) Date of Patent: Jul. 15, 2008

(54) METHOD FOR EXECUTING COMPUTER FUNCTION OPTIONS WITH INTELLIGENT MEMORY FOR COMPUTER-BASED MULTIMEDIA SYSTEM

(75) Inventor: Huai Cheng Wang, Taipei (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 328 days.

(21) Appl. No.: 11/293,232

(22) Filed: Dec. 5, 2005

(65) Prior Publication Data

US 2007/0067615 A1    Mar. 22, 2007

(30) Foreign Application Priority Data

Sep. 16, 2005   (TW) ............................ 94132158 A

(51) Int. Cl.
G06F 9/00 (2006.01)
G06F 15/177 (2006.01)
G06F 1/24 (2006.01)
(52) U.S. Cl. ................... 713/1; 713/2; 713/100
(58) Field of Classification Search ............... 713/1
See application file for complete search history.

(56) References Cited

U.S. PATENT DOCUMENTS 6,351,225 B1 *   2/2002  Moreno ................. 341/22
7,130,994 B2 *  10/2006  Lin et al. ................. 713/1
2005/0206611 A1 *   9/2005  Ching et al. ............. 345/156
2006/0064688 A1 *   3/2006  Tseng ................... 718/1

FOREIGN PATENT DOCUMENTS

EP    1460536    9/2004

* cited by examiner

Primary Examiner—Rehana Perveen
Assistant Examiner—Stefan Stoynov
(74) Attorney, Agent, or Firm—Rosenberg, Klein & Lee

(57) ABSTRACT

A method for executing computer function option with intelligent memory is provided, including loading the multimedia application program corresponding to the pressed function option button into the image file memory region of the system memory for execution when detecting a function option button is pressed. When the user shuts down a function option, the multimedia application program stops execution and is stored in an image file format into the pre-determined memory address in the data storage. When the computer detects the same function option button being pressed by the user for activation, the computer loads the program image file corresponding to the function option button into the image file memory region of the system memory, and executes the program image file.

5 Claims, 4 Drawing Sheets

METHOD FOR EXECUTING COMPUTER FUNCTION OPTIONS WITH INTELLIGENT MEMORY FOR COMPUTER-BASED MULTIMEDIA SYSTEM

FIELD OF THE INVENTION

The present invention relates to a method for booting a computer system and, more particularly, to a method for executing computer function options with intelligent memory.

BACKGROUND OF THE INVENTION

The multimedia playing system made with the integration of a computer system and an audiovisual player is gaining popularity and is widely used on many occasions, including offices and households, because of the rapid development of computer technology. Similarly, computers integrated with intelligent appliances (IA) are also widely available in the consumer market.

Conventional multimedia playing systems are basically interfacing a computer system with an audiovisual player. The user usually needs to boot up the computer system first before he or she activates and operates the audiovisual player. In other words, the user must wait until the computer system completes the BIOS program initialization, POST program, peripheral detection and driving, OS activation, system state setting, and so on, before the user can execute the audiovisual program to play the audiovisual data.

To speed up the booting process, conventionally, a second operating system is installed in a second region of a hard disk of the computer to provide the multimedia playing or intelligent appliance functions.

However, although the aforementioned method provides the user with the choice of normal computer booting process or executing multimedia playing function, the computer still needs to read the operating system, drivers, application programs and the data when the computer is booted. The speed and efficiency of the computer system is still limited by the access speed of the hard disk.

Since hardware design of a computer-based multimedia system is different from a household appliance, the time required for booting the computer-based multimedia system is usually much longer than that of a household appliance. With this type of design, the user usually needs to boot the computer system up in order to activate and operate the audiovisual player. In other words, the user must wait until the computer system completes the BIOS program initialization, POST program, peripheral detection and driving, OS activation, system state setting, and so on, before the user can execute the audiovisual program to play the audiovisual data. It is inconvenient for the user as there is no shortcut to bypass the tedious booting process of the computer system.

Furthermore, when the user operates the function option button to activate multimedia playing, the computer must access the hard disk for multimedia application program and execute the program. When the user shuts down and re-activates the multimedia playing function, the computer still requires to access the hard disk for multimedia application program and executes the program. The execution remains the same for both executions, and the use of computer resources remains the same as well.

SUMMARY OF THE INVENTION

Thus, the present invention is aimed to overcome the above drawbacks of the conventional device by providing a method for executing computer function options with intelligent memory.

Therefore, the primary object of the present invention is to provide a method for fast activation of computer function options so that when a function option is selected for a second time, the execution speed is faster and less computer resource is used.

Another object of the present invention is to provide a fast method for executing computer function options with intelligent memory. The function option, once used by a user, is recorded at a pre-determined memory address of a data storage in a program image file format. When the user selects the same function option, the program image file can be extracted fast for execution.

To achieve the aforementioned objects, the present invention provides a method, which, when detecting a function option button is selected by a user and depressed, loads a multimedia application program corresponding to the user-selected and depressed function option button into a preset image file region of the system memory for execution. When the user shuts down the function option, the multimedia application program stops execution and is stored in an image file format into the pre-determined memory address in the data storage. When the computer detects the same function option button is depressed by the user for activation, the computer loads the program image file corresponding to the function option button into the image file region of the system memory, and executes the image file.

In a preferred embodiment, the data storage also stores a program image file index in addition to the program image files. The program file index stores starting addresses and file sizes of all the program image files. Furthermore, the data storage also includes at least an associated parameter file. Each associated parameter file corresponds to a program image file for storing the parameters set by the user when the program image file is executed.

In comparison with the conventional methods, the present invention allows the computer to store a program image file in the data storage when detecting the user selecting and executing a function option. When the same function option is re-activated later, the computer loads the program image file corresponding to the function option button into the image file region of the system memory, and executes the image file so that the execution speed is faster and less computer resource is used.

These and other objects, features and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
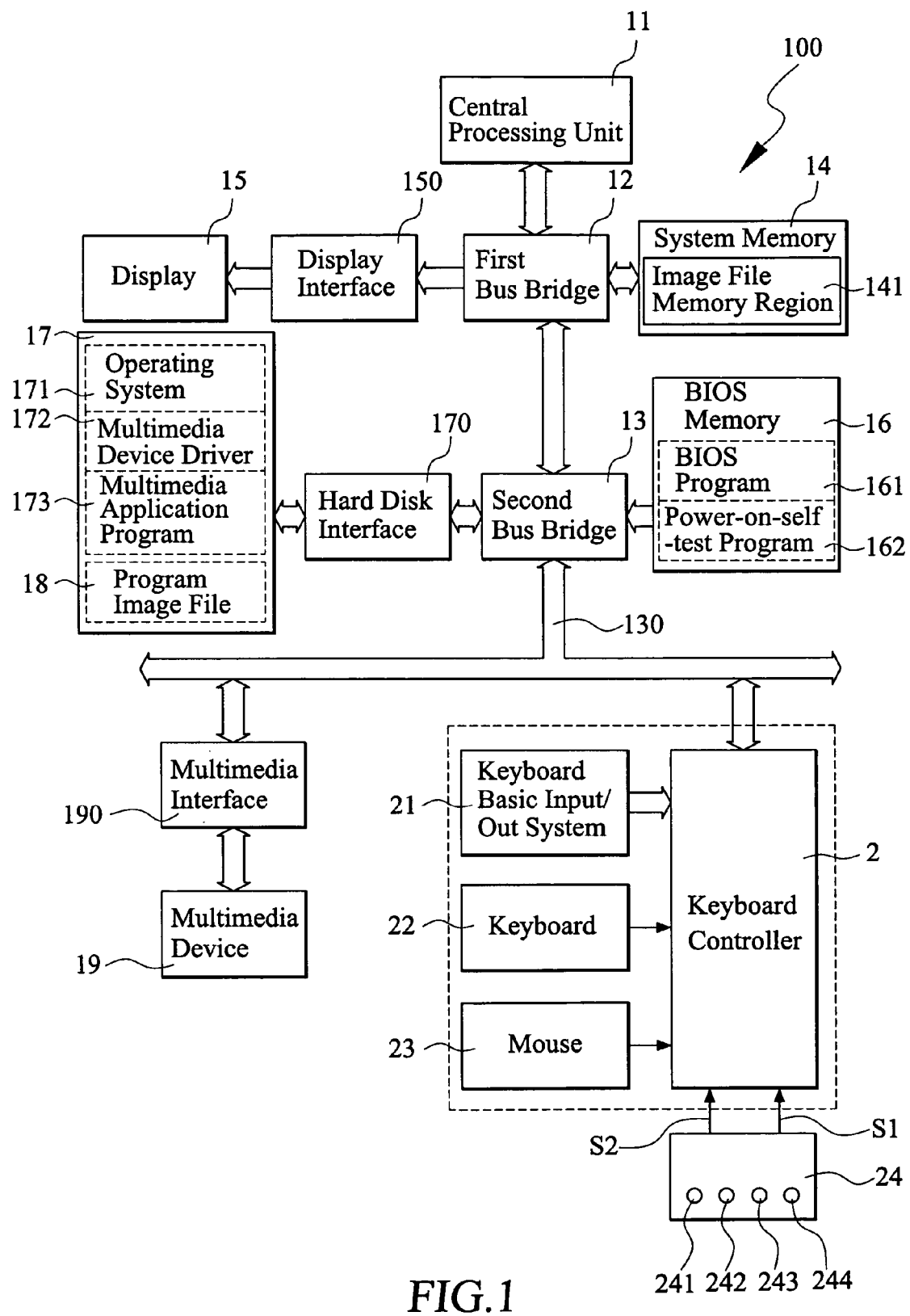
FIG. 1 shows a functional block diagram of an embodiment of the present invention.

With reference to the drawings and in particular to FIG. 1, which shows a functional block diagram of an embodiment of the present invention, in the embodiment, a computer 100 comprises a central processing unit (CPU) 11, a first bus bridge 12, and a second bus bridge 13. The central processing unit 11 is connected to the first bus bridge 12 through a system bus. The first bus bridge 12 is connected to a system memory 14, and connected to a display 15 through a display interface 150.

The second bus bridge 13 is connected to a BIOS memory 16. The BIOS memory 16 stores a BIOS program 161 and a power-on-self-test (POST) program 162, required by computer 100 during the booting.

The second bus bridge 13 is connected to a hard disk interface 170 through a bus. The hard disk interface 170 is connected to a hard disk 17. The hard disk 17 served as a storage device for storing data in the present invention. The hard disk 17 is installed with an operating system 171, such as Windows operating system, at least a device driver 172 and multimedia application program 173. In actual application, the multimedia device driver 172 and the multimedia application program 173 can include drivers and applications for CD player, digital music device, VCD player and TV signal receiver.

The second bus bridge 13 of the computer 100 is connected to a multimedia interface 190 through a bus 130. The multimedia interface 190 is connected to a multimedia device 19. The multimedia device 19 can be a CD player, a digital music device, a VCD player or a TV signal receiver.

The second bus bridge 13 of the computer 100 is connected to a keyboard controller 2 through the bus 130. The keyboard controller 2 is connected to a keyboard basic input/out system (keyboard BIOS) 21, a keyboard 22, and a mouse 23.

The keyboard controller 2 is connected to a function option signal generation unit 24. The function option signal generation unit 24 includes a plurality of function option buttons 241, 242, 243, 244 or other elements for generating signals. The functional option signal generation unit 24, according to a user's operation, generates different device activation signals s1 to the keyboard controller 2. The device activation signal s1 can also be generated by depressing pre-determined keys on the keyboard 22.

In actual applications, the function option signal generation unit 24 can be defined as control buttons for activating or shutting down multimedia devices. The function option signal generation unit 24 can be buttons installed on the multimedia device panel or computer, or buttons on a remote controller.

Figure 2:
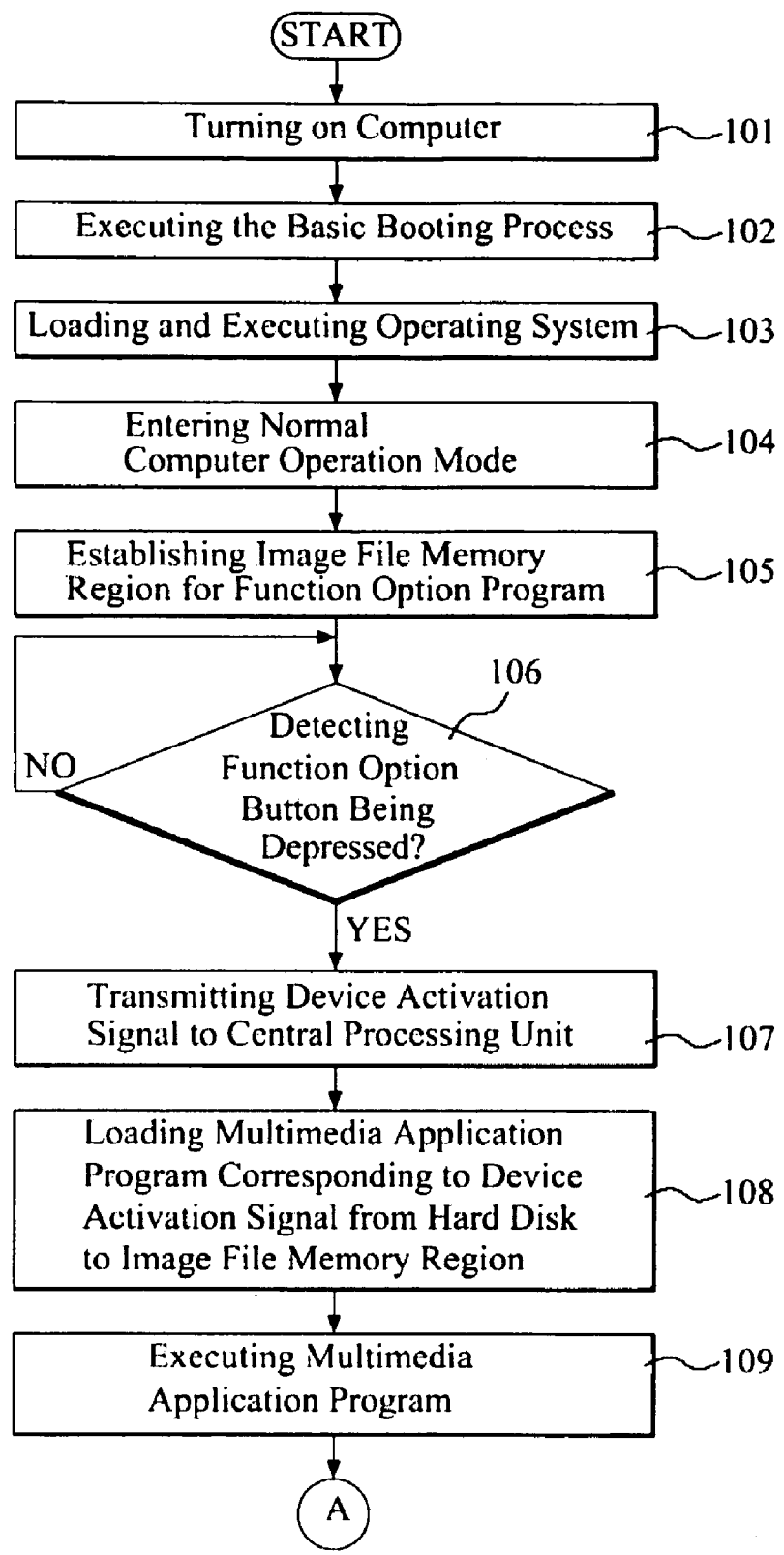
FIGS. 2 and 3 show a flowchart of the embodiment of FIG. 1.

Also referring to FIGS. 2 and 3, which show flowchart of the present invention, which will be described as follows with further reference to FIG. 1.

In step 101, the computer 100 is turned on. In step 102, the computer 100 executes the basic booting process. That is, the computer 100 loads and executes the BIOS program 161 and the POST program 162 from the BIOS memory 16. After the computer 100 finishes system initialization and POST, the computer 100 loads and executes the operating system 171 (step 103) from the hard disk 17, loads and executes the multimedia device drivers 172, and enters the normal computer operation mode (step 104). At this point, the user can operate the computer 100 as a normal computer device.

When the computer 100 finishes loading and execution of the operating system 171, an image file memory region 141 for the function option program is established in the system memory 14 (step 105).

Then, the keyboard controller 2 detects the state of the function option signal generation unit 24. When the keyboard controller 2 detects that a user depresses a function option button in the function option signal generation unit 24 (step 106), a device activation signal s1 that is generated by the function option signal generation unit 24 is detected by the keyboard controller 2 and transmitted through a bus to the central processing unit 11 for processing (step 107).

When the central processing unit 11 receives the device activation signal s1, the multimedia application program 173 corresponding to the device activation signal s1 is loaded from the hard disk 17 to the image file memory region 141 of the system memory 14 (step 108) and then the multimedia application program 173 is executed (step 109). At this point, the multimedia device 19 is activated.

Figure 3:
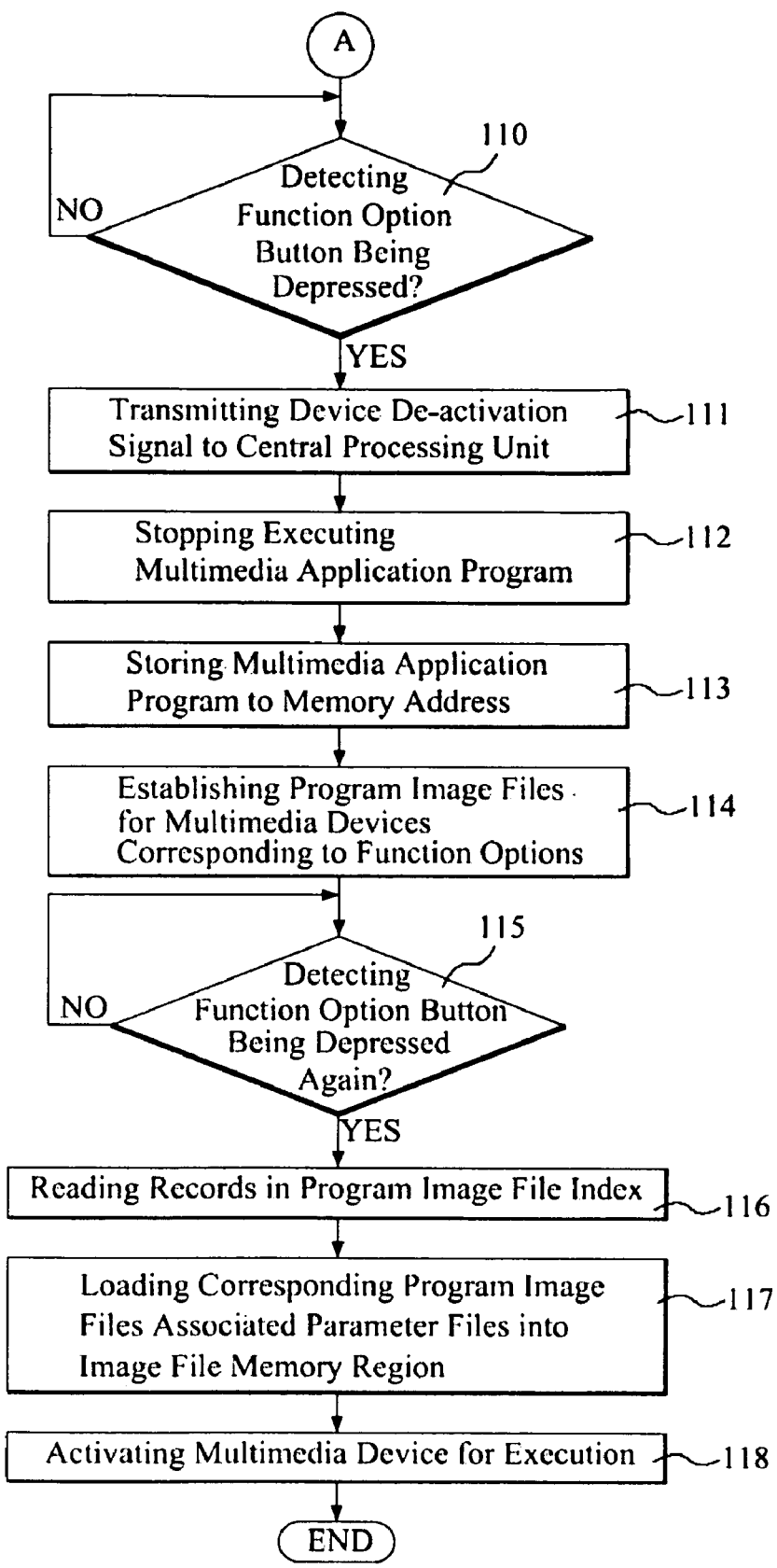

Referring to FIG. 3, when the user depresses a function option button in the function option signal generation unit 24 to shut down the multimedia device (step 110), the operation is also detected by the keyboard controller 2 and a device de-activation signal s2 is generated and transmitted through a bus to the central processing unit 11 for processing (step 111). When the central processing unit 11 detects the operation of the function option signal generation unit 24, the execution of the multimedia application program 173 is stopped (step 112). Then, the multimedia application program 173 is stored to a pre-determined memory address in the hard disk 17 as a program image file 18 (step 113).

After the above-described process, the hard disk 17 establishes a plurality of program image files AP1, AP2, AP3, AP4 for multimedia devices corresponding to function options that have been activated, and a program image file index 181 (step 114).

Figure 4:
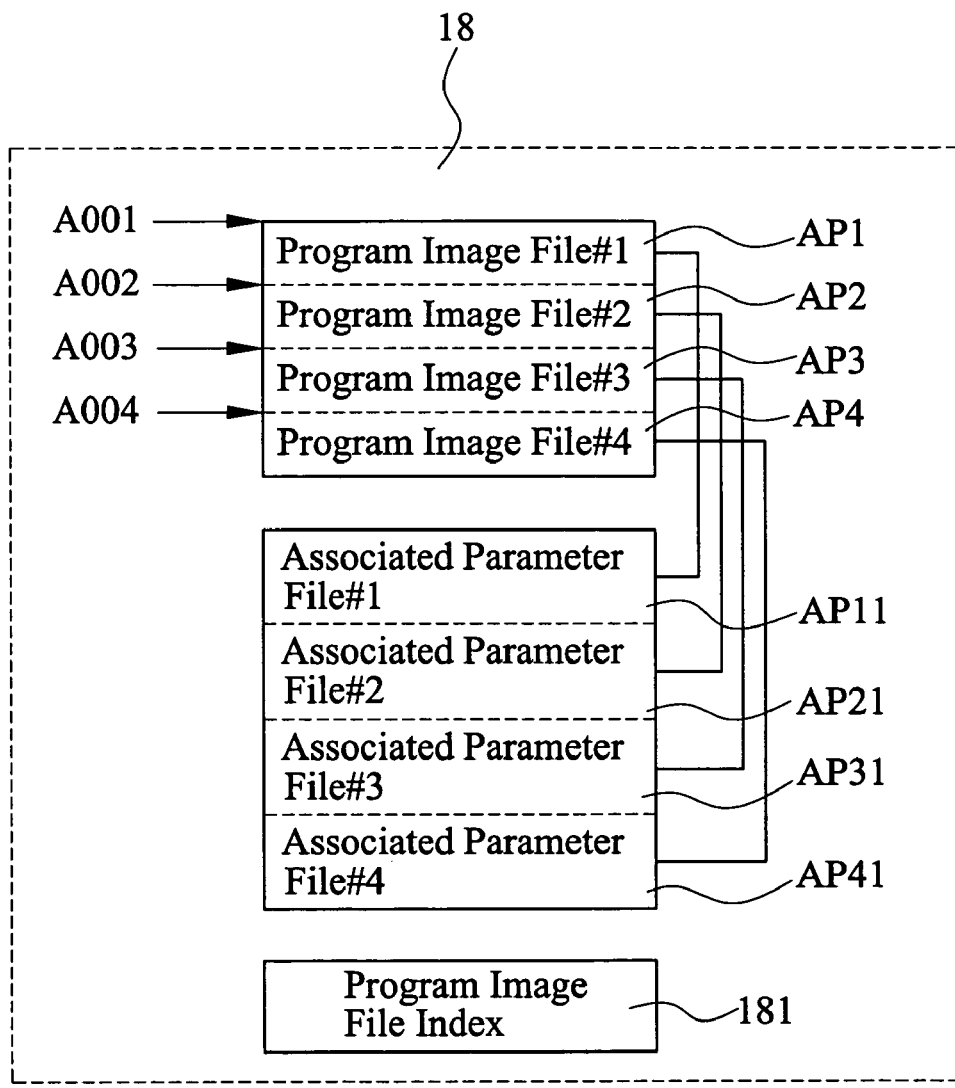
FIG. 4 shows a schematic view of the program image files and program image file index in the hard disk.

As shown in FIG. 4, the program image files AP1, AP2, AP3, and AP4 are the image files of the application programs for the multimedia devices corresponding to different function option buttons 241, 242, 243, 244.

The program image files AP1, AP2, AP3, and AP4 have starting addresses A001, A002, A003, A004, respectively. The program image file index 181 records the starting addresses and file sizes of the program image files.

In addition, each program image file AP1, AP2, AP3, AP4 is associated with an associated parameter file AP11, AP21, AP31, AP41 for storing the parameter settings set by the user when using the application program, such as volume, sound quality, channel, and so on.

Once the program image files AP1, AP2, AP3, AP4 and the program image file index 181 are established in the hard disk, when computer detects a user depressing the function option button 241, 242, 243, 244 again (step 115), the central processing unit 11 reads the records in the program image file index 181 (step 116) and load the corresponding program image files AP1, AP2, AP3, AP4 and associated parameter files AP11, AP21, AP31, AP41 into the image file memory region 141 of the system memory 14 (step 117). After the default image file recovery process, the application program can be executed directly so that the multimedia device 19 is activated for execution (step 118).

While the present invention has been described in connection with what is presently considered to the most practical and preferred embodiment, it is to be understood that the invention is not to be limited to the disclosed embodiment, but on the contrary, is intended to cover various modifications and equivalent arrangement included within the spirit and scope of the appended claims.

What is claimed is:

1. A method for executing computer function options for a computer-based multimedia system, a computer of the multimedia system comprising a central processing unit, a data storage, a system memory, a BIOS, a function option signal generation unit having at least a function option button, and at least a multimedia device, the data storage storing at least an operating system, at least a multimedia device driver, at least a multimedia application program, the method comprising the steps of:

(a) booting the computer;
(b) establishing an image file memory region for function option application programs in the system memory;
(c) detecting if the function option buttons of the function option signal generation unit are operated for activation;
(d) loading and executing the multimedia application program corresponding to the operated function option button into the image file memory region of the system memory when detecting any function option button is depressed;
(e) detecting if the function option buttons of the function option signal generation unit are operated for de-activation;
(f) stopping executing the multimedia application program when detecting any function option button is depressed for de-activation; and
(g) storing the multimedia application program as a program image file into a pre-determined memory address in the data storage, the data storage storing at least a program image file;

wherein when the computer detects a same function option button is operated by the user to activate again, the computer loads the program image file into the image file memory region of the system memory for execution.

2. The method as claimed in claim 1, wherein step (a) comprises using a multimedia device driver to drive the multimedia device.

3. The method as claimed in claim 1, wherein operation state of the function option signal generation unit is detected by a keyboard controller of the computer in step (c).

4. The method as claimed in claim 1, wherein step (g) further comprises establishing a program image file index in the data storage for storing a starting address and a file size of the program image file.

5. The method as claimed in claim 1, wherein step (g) further comprises establishing an associated parameter file in the data storage for storing parameter settings set by the user when executing the corresponding multimedia application program.

* * * * *